2,970,146
NEW HETEROCYCLIC ORTHOQUINONES
Richard J. Boyle, Neshanic, N.J., Oscar G. Birsten, New York, N.Y., and William L. Mosby, North Plainfield, N.J., assignors to American Cyanamid Company, New York, N.Y., a corporation of Maine
No Drawing. Filed Apr. 4, 1958, Ser. No. 726,346
9 Claims. (Cl. 260—256.4)

This invention relates to ortho quinones of new heterocyclic ring systems and to azines derived therefrom. More specifically, it relates to compounds of the formula:

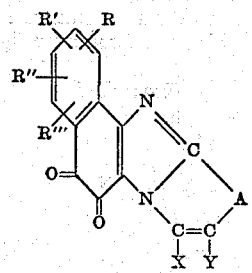

in which A may be —S—, —CH=CH—, or —CH=N—; X and Y may be either both hydrogen or lower alkyl or one hydrogen and the other lower alkyl or jointly the group —CH=CH—CH=CH—, and R, R', R", and R''' may be hydrogen, bromine, chlorine, nitro, or hydroxy. More specifically also, it relates to new compounds of the formula:

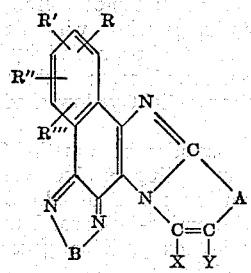

in which A, X, Y, R, R', R", and R''' are defined as above and B is a carbocyclic ring system of not more than three six-membered rings to which the nitrogens are linked through vicinal carbons. These new compounds of our invention can be used as vat dyes and as pigments.

The compounds of the above structure which form our invention can be illustrated by the following compounds to which the approved Chemical Abstract name is given:

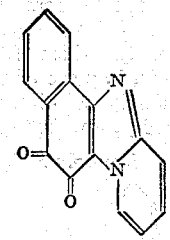

Naphth[1',2',4,5]imidazo[1,2-a]pyridine-5,6-dione

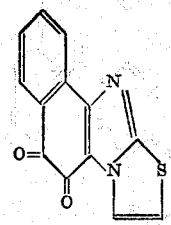

Naphth[1',2',4,5]imidazo[2,1-b]thiazole-5,6-dione

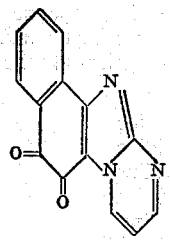

Naphth[1',2',4,5]imidazo[1,2-a]pyrimidine-5,6-dione

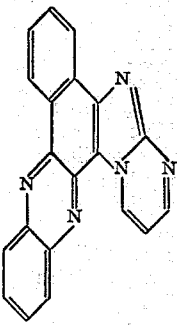

Benzo[a]pyrid[2',2',1,2]imidazo[4,5-c]phenazine

The quinone compounds of our invention are prepared by condensing a 2,3-dihalo-1,4-naphthoquinone, preferably the 2,3-dichloro compound, with an amino nitrogen-heterocyclic compound carrying an amino group linked to a carbon adjacent to the heterocyclic nitrogen. This reaction can be illustrated by the following schematic equation in which A, X and Y have the same meaning as before:

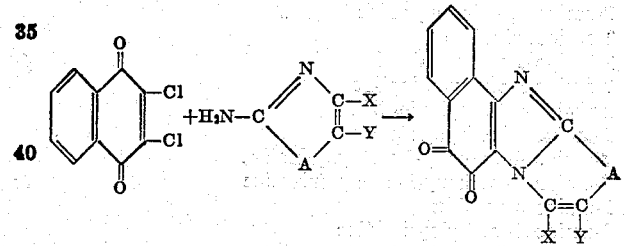

The reaction is carried out by heating the naphthoquinone derivative with the aminoheterocyclic compound in an organic solvent. An acid acceptor should be present to take up the hydrogen halide liberated. This may be either an extra mole of the aminoheterocyclic compound or it can be an alkaline reagent such as sodium carbonate. Solvents such as ethanol, ethoxyethanol, methoxyethanol, and the like are readily usable.

The phenazine products of our invention are obtained by treatment of the quinones obtained above with orthodiamines. With the simpler orthodiamines, as for example, orthophenylene diamine, the phenazine derivative is readily obtained directly. With the more complicated diamines, as for example, 1,2-diaminoanthraquinone, an intermediate anil is formed which in turn may be ring-closed to the phenazine by vigorous treatment with a ring closing agent such as polyphosphoric acid.

Among the 1,4-naphthoquinones which may be used as a starting material in the preparation of the compounds of our invention, there may be mentioned 2,3-dichloro-1,4-naphthoquinone,
2,3-dibromo-1,4-naphthoquinone,
2,3,5,8-tetrachloro-1,4-naphthoquinone,
5-nitro-2,3-dichloro-1,4-naphthoquinone,
2,3-dibromo-5-hydroxy-1,4-naphthoquinone,
2,3,6-tribromo-5-hydroxy-1,4-naphthoquinone,
2,3,5,8-tetrabromo-1,4-naphthoquinone,
2,3,5-trichloro-1,4-naphthoquinone, 2,3-dichloro-5-bromo-1,4-naphthoquinone,
2,3,6,7-tetrabromo-1,4-naphthoquinone, and
2,3,5,6,7,8-hexachloro-1,4-naphthoquinone.

The aminoheterocyclic compounds which may be used in the condensation described above to form the compounds of our invention include the following:

2-aminopyridine
2-amino-3-methylpyridine
2-amino-4-methylpyridine
2-amino-5-methylpyridine
2-amino-6-methylpyridine
2-amino-5-chloropyridine
2-amino-4,6-dimethylpyridine
2-amino-5-nitropyridine
2-amino-3-bromopyridine
2-amino-4-bromopyridine
2-amino-5-bromopyridine
2-amino-3-bromo-5-nitropyridine
2-amino-6-chloropyridine
2-amino-3-chloro-5-nitropyridine
2-amino-3,4-dibromopyridine
2-amino-3,5-dibromopyridine
2-amino-5-iodopyridine
2-amino-5-bromo-3-nitropyridine
2-amino-6-chloro-3-phenylpyridine
2-amino-4-ethylpyridine
2-amino-6-bromopyridine
2-amino-3-iodopyridine
2-amino-4-iodopyridine
2-amino-6-ethoxypyridine
2-amino-5-ethoxypyridine
2-amino-3,5-dinitropyridine
2-amino-3,5-dichloropyridine
2-amino-3',4-dichloropyridine
2-amino-4-chloropyridine
2-amino-3-chloropyridine
2-amino-3,5-diodopyridine
2-aminoquinoline
2-amino-8-ethoxyquinoline
2-amino-3-phenylquinoline
2-amino-6-methylquinoline
2-amino-8-methylquinoline
2-amino-6-methoxy-3-phenylquinoline
2-amino-8-methoxy-3-phenylquinoline
2-aminopyrimidine
2-amino-4-methylpyrimidine
2-amino-4-isobutylpyrimidine
2-amino-4-ethylpyrimidine
2-amino-4-ethoxypyrimidine
2-amino-4-amylpyrimidine
2-amino-4-methyl-5-amylpyrimidine
2-amino-4-chloropyrimidine
2-amino-5-butylpyrimidine
2-amino-4-t-butylpyrimidine
2-amino-5-chloropyrimidine
2-amino-5-chloro-4,6-dimethylpyrimidine
2-amino-4-chloro-6-ethoxypyrimidine
2-amino-4-chloro-6-ethylpyrimidine
2-amino-4,6-diethoxypyrimidine
2-amino-4,6-diodopyrimidine
2-amino-4-methoxypyrimidine
2-amino-4-hexylpyrimidine
2-amino-4-methyl-5-ethylpyrimidine
2-amino-4,6-diphenylpyrimidine
2-amino-4,6-dipropoxypyrimidine
2-amino-4-chloro-6-methylpyrimidine
2-amino-4,6-dichloropyrimidine
2-amino-4,6-dimethylpyrimidine
2-aminothiazole
2-aminoquinoxoline
2-aminopyrazine
2-aminooxazole
2-aminobenzoxazole, and the like It is to be noted that by starting with a nitro dichloro-1,4-naphthoquinone, a nitro compound is obtained. However, alternatively, the nitro group may be introduced by nitration after the compounds of our invention have been formed. This is accomplished by the standard nitration procedure with a mixed acid. Similarly, the compounds can be sulfonated. Either the sulfonic acids or amines so produced can be subjected to the standard replacement reactions of aromatic chemistry, such as replacement of amine by hydroxyl, or halogens (chlorine, bromine or iodine), cyano, mercapto, and the like, by the Sandemeyer route.

The quinonoid products of our invention are vat dyes and by the usual vatting procedure can be used to dye cotton. The phenazine derivatives of these vat dyes are colored compounds with very low solubility, and consequently are quite useful as pigments.

Our invention can be further illustrated by the following examples in which parts are by weight unless otherwise specified.

*Example 1*

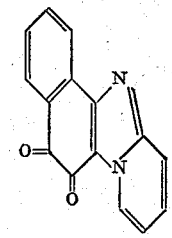

A mixture of 68.1 parts of 2,3-dichloro-1,4-naphthoquinone, 56.4 parts of 2-aminopyridine and 450 parts of ethanol is heated with stirring at the reflux temperature until the reaction is substantially complete and then allowed to cool to room temperature. The product is removed by filtration, washed with alcohol and dried. The crude product can be purified by recrystallization from chlorobenzene and ortho dichlorobenzene. This quinone dyes cotton a light yellow shade from a bright red vat.

If equivalent quantities of 6-methyl-2-amino-pyridine are used, a corresponding product carrying a methyl group in the hetero-ring is obtained. Similarly, equivalent quantities of 2-amino-5-chloro, bromo, or iodopyridine or 2-amino-6-ethoxypyridine gives the corresponding substituted product.

*Example 2*

A mixture of 90 parts of ethanol, 11.4 parts of 2,3-dichloro-1,4-naphthoquinone, 4.7 parts of 2-aminopyridine and 6 parts of sodium carbonate is heated at the reflux temperature with stirring until reaction is substantially complete and is then allowed to cool. The yellow solid product which forms is removed by filtration and washed with ethanol and extracted with hot water. The crude product can be recrystallized from chlorobenzene. It is identical to the product of Example 1.

Similarly, equivalent quantities of 2-aminoquinoline or 2-amino-5-nitropyridine, in place of the 2-aminopyridine, gives the correspondingly substituted products, orange from the quinoline and yellow from the nitropyridine.

*Example 3*

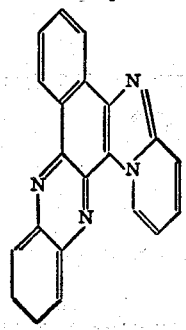

A mixture of 4.96 parts of the product obtained in Example 1, 2.16 parts of orthophenylene diamine and 75 parts of glacial acetic acid is heated at the reflux temperature with stirring until the reaction is substantially complete and then allowed to cool to room temperature. The bright yellow product which forms is removed by filtration, washed with alcohol and dried. By recrystallization from chlorobenzene and methoxyethanol, the pure phenazine is obtained.

*Example 4*

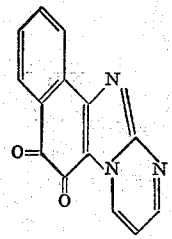

A mixture of 11.4 parts of 2,3-dichloro-1,4-naphthoquinone, 9.5 parts of 2-aminopyrimidine and 80 parts of 2-methoxyethanol is heated at the reflux temperature with stirring until the reaction is substantially complete and then allowed to cool to room temperature. The solid material which forms is removed by filtration, washed thoroughly with alcohol, and extracted with hot water. Recrystallization from trichlorobenzene gives the pure greenish-yellow quinone which dyes glycolpolyterephthalate fibers a light yellow shade.

When an equivalent quantity of 2-amino-4-isobutyl-pyrimidine, 2-amino-5-chloropyrimidine, 2-amino-4,6-dipropoxypyrimidine, or 2-amino-4-6-diphenylpyrimidine is used, the correspondingly substituted product is obtained.

*Example 5*

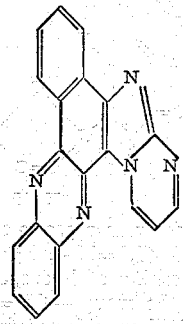

A mixture of 0.5 part of the compound prepared in Example 4, 0.25 part of orthophenylene diamine, and 35 parts of glacial acetic acid is stirred at the reflux temperature until the reaction is substantially complete and is then allowed to cool to room temperature. The solid product which forms is removed by filtration, washed with alcohol and dried. The crude product can be recrystallized from chlorobenzene to give the pure yellow phenazine.

*Example 6*

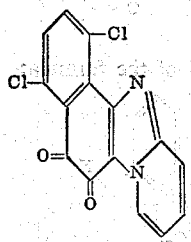

A mixture of 6.51 parts of 2,3,5,8-tetrachloro-1,4-naphthoquinone and 4.14 parts of 2-aminopyridine in 85 parts of ethanol is heated at the reflux temperature with stirring until the reaction is substantially complete and is then allowed to cool to room temperature. The solid product which forms is removed by filtration, washed with alcohol, and dried. By recrystallization from orthodichlorobenzene, the pure orange quinone is obtained.

This product may be used to dye cellulosic fiber yellow from a yellowish-red vat by the following procedure: A mixture of 1 part of the above orthoquinone, 3 parts of sodium hydrosulfite and 100 parts of water containing 10 parts of 24% sodium hydroxide solution is heated at 140° F. for 20 minutes. The mixture is then diluted with 200 parts of water at 140° F. and the skein of cellulosic fiber is immersed in the dyebath. After remaining in the dyebath 45 minutes at this temperature, the skein is removed, air-oxidized, soaped, rinsed and dried. It is dyed a yellow shade.

When 2,3,6,7-tetrabromo-1,4-naphthoquinone is substituted in equivalent quantities for the tetrachloro naphthoquinone, a dibromo product of similar structure to the above is obtained.

*Example 7*

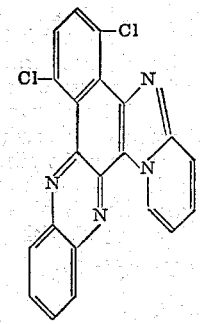

A mixture of about 275 parts of methoxyethanol, 1.08 parts of orthophenylene diamine and 1.59 parts of the product as prepared in Example 6 is heated at the reflux temperature with stirring until the reaction is substantially complete. After cooling, the solid product is removed by filtration, washed with alcohol and dried. The crude product can be purified by recrystallization from chlorobenzene to give a gold colored product.

*Example 8*

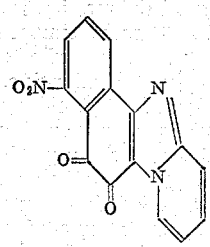

and

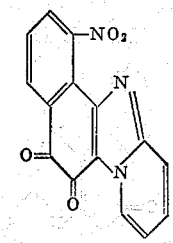

A mixture of 5.98 parts of 5-nitro-2,3-dichloro-1,4-naphthoquinone, 4.14 parts of 2-aminopyridine and 70 parts of ethanol is heated at the reflux temperature with stirring until the reaction is substantially complete, and, after cooling, the solid product which is formed is removed by filtration. The crude material is extracted with orthodichlorobenzene and insoluble product is removed.

The desired product crystallizes from the orthodichlorobenzene as a pure orange-red nitro derivative. The product insoluble in orthodichlorobenzene is recrystallized from nitrobenzene giving an isomeric orange nitro derivative. The dichlorobenzene-soluble isomer has a yellowish-red vat and dyes cotton a bluish-red shade. The dichlorobenzene-insoluble isomer dyes cotton a very pale pink shade from a brownish-red vat.

*Example 9*

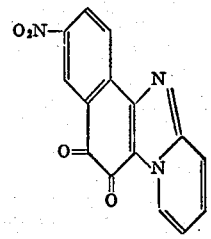

To 100 parts of concentrated sulfuric acid is added 2.48 parts of the product described in Example 1 and 1.5 parts of concentrated nitric acid. The mixture is stirred and heated gradually to 125° C. and held at that temperature until the reaction is substantially complete. An additional equal quantity of concentrated nitric acid is added during the heating to insure complete reaction. The reaction mixture is cooled slightly and then drowned in a large volume of water. The solid product which forms is removed by filtration and washed acid-free with water. By recrystallization from ortho-dichlorobenzene, a pure orange nitro derivative is obtained. This dyes cotton a green shade from a yellowish-red vat.

*Example 10*

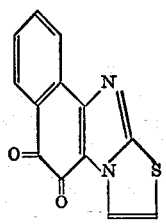

A mixture of 17 parts of 2,3-dichloro-1,4-naphthoquinone, 15 parts of 2-aminothiazole and 100 parts of 2-ethoxyethanol methyl ether is heated with stirring at the reflux temperature until the reaction is substantially complete. After cooling to room temperature, the mixture is diluted with about 100 parts of ethanol and the solid product is then removed by filtration. The product is purified by precipitating from a solution in orthodichlorobenzene with methyl cyclohexane and then by further dissolving in trichlorobenzene and reprecipitating again with methyl cyclohexane. This quinone dyes cotton a grayish-brown shade from a yellowish-brown vat.

If the 2-aminothiazole is replaced with an equivalent amount of 2-aminopyrazine or 2-aminooxazole, the corresponding heterocyclic product is obtained.

*Example 11*

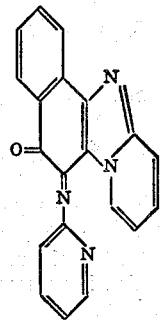

A mixture of 22.7 parts of 2,3-dichloro-1,4-naphthoquinone, 37.6 parts of 2-aminopyridine and 180 parts of ethanol is heated at the reflux temperature with stirring until the reaction is substantially complete. After cooling to room temperature, the product which forms is removed by filtration, washed thoroughly with alcohol, and dried. Recrystallization from chlorobenzene gives the pure reddish-brown anil, which is hydrolyzed by dilute sulfuric acid to give the product of Example 1.

*Example 12*

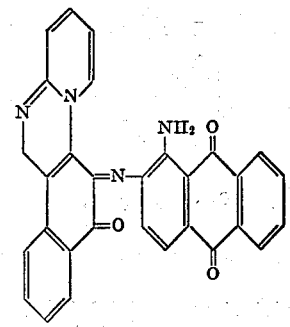

A mixture of 1.75 parts of the product whose preparation is described in Example 1, 2.5 parts of 1,2-diaminoanthraquinone and 75 parts of glacial acetic acid is stirred at the reflux temperature until the reaction is substantially complete. The solid material which formed is removed by filtration, washed with alcohol, and dried. Recrystallization from trichlorobenzene gives the pure violet anil. The anil is ring-closed to the phenazine derivative by heating in polyphosphoric acid, followed by drowning in water.

We claim:
1. Compound of the formula:

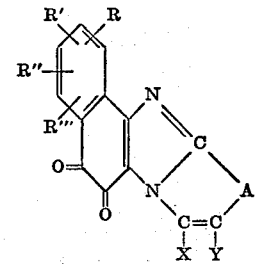

in which A is selected from a group consisting of —S—, —CH=CH—, and —CH=N—, X and Y are selected from the group consisting of hydrogen and lower alkyl and, taken together, the group —CH=CH—CH=CH—, and R, R', R" and R'" are selected from the group consisting of H, Cl, Br, and nitro.

2. The compound of the formula:

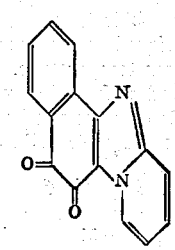

3. The compound of the formula:

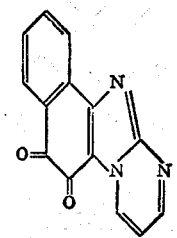

4. The compound of the formula:
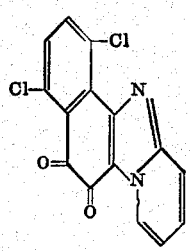
5. The compound of the formula:
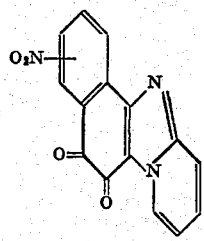
6. The compound of the formula:
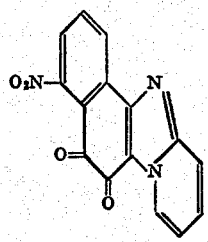
7. The compound of the formula:
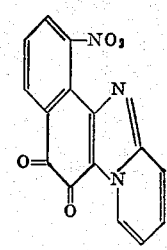
8. The compound of the formula:
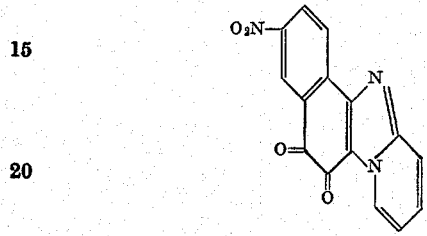
9. The compound of the formula:
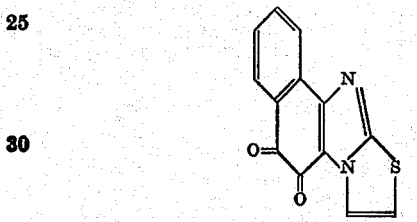
No references cited.